US012146747B2

(12) United States Patent
Tomono (10) Patent No.: US 12,146,747 B2
(45) Date of Patent: Nov. 19, 2024

(54) SELF-LOCALIZATION DEVICE (71) Applicant: Chiba institute of technology, Chiba (JP)

(72) Inventor: Masahiro Tomono, Chiba (JP)

(73) Assignee: CHIBA INSTITUTE OF TECHNOLOGY, Chiba (JP)

(*) Notice: Subject to any disclaimer, the term of this patent is extended or adjusted under 35 U.S.C. 154(b) by 228 days.

(21) Appl. No.: 17/905,015

(22) PCT Filed: Mar. 13, 2020

(86) PCT No.: PCT/JP2020/011218
§ 371 (c)(1),
(2) Date: Aug. 25, 2022

(87) PCT Pub. No.: WO2021/181686
PCT Pub. Date: Sep. 16, 2021

(65) Prior Publication Data
US 2023/0110609 A1    Apr. 13, 2023

(51) Int. Cl.
*G01C 21/30*    (2006.01)
*G01C 21/00*    (2006.01)
(Continued)

(52) U.S. Cl.
CPC ......... *G01C 21/30* (2013.01); *G01C 21/3804* (2020.08); *G01S 17/08* (2013.01);
(Continued)

(58) Field of Classification Search
None
See application file for complete search history.

(56) References Cited

U.S. PATENT DOCUMENTS 10,663,972 B2 * 5/2020 Park ................. G05D 1/0219
2018/0299557 A1 10/2018 Yi et al.
(Continued)

FOREIGN PATENT DOCUMENTS

JP    2004-280138 A    10/2004
JP    2015-144013 A    8/2015
(Continued)

OTHER PUBLICATIONS

European Search Report issued on Oct. 30, 2023 for the corresponding European Patent Application No. 20924757.6.
(Continued)

*Primary Examiner* — David P. Merlino
(74) *Attorney, Agent, or Firm* — Pearne & Gordon LLP (57) ABSTRACT

A self-localization device that can reduce the processing time even when estimating the self-location in an environment where the number of pieces of three-dimensional point group data is large wherein the self-localization device includes an estimation unit that includes: a map generation unit that generates a map of surroundings of the mobile robot based on three-dimensional point group data detected by a detection unit; a geometric feature extraction unit that extracts geometric features from a current map and extracts geometric features from a past map; a self-location calculation unit that selects the geometric features extracted by the geometric feature extraction unit as sets of geometric features and calculates self-locations in the past map; and a self-location evaluation unit that evaluates a degree of coincidence between the current map and the past map for each set of geometric features.

7 Claims, 7 Drawing Sheets

(51) Int. Cl.
  *G01S 17/08*    (2006.01)
  *G01S 17/89*    (2020.01)
  *G05D 1/00*    (2006.01)

(52) U.S. Cl.
  CPC ............ *G01S 17/89* (2013.01); *G05D 1/0248* (2013.01); *G05D 1/0274* (2013.01)

(56) References Cited

U.S. PATENT DOCUMENTS

| | | |
|---|---|---|
| 2019/0079193 A1 | 3/2019 | Gunnam |
| 2020/0042010 A1 | 2/2020 | Nakajima |
| 2020/0043186 A1* | 2/2020 | Selviah ............... G06T 7/33 |
| 2020/0142028 A1* | 5/2020 | Nemati ............. G05D 1/0276 |
| 2021/0148707 A1* | 5/2021 | Kawabayashi .... G01C 21/3602 |
| 2022/0066456 A1* | 3/2022 | Ebrahimi Afrouzi ..................... G06F 3/04883 |

FOREIGN PATENT DOCUMENTS

| | | |
|---|---|---|
| JP | 2017083230 A | 5/2017 |
| JP | 2017-117386 A | 6/2017 |
| JP | 2020-021257 A | 2/2020 |

OTHER PUBLICATIONS

International Search Report dated May 12, 2020 filed in PCT/JP2020/011218.

\* cited by examiner

SELF-LOCALIZATION DEVICE

TECHNICAL FIELD

The present invention relates to a self-localization device of a mobile body.

BACKGROUND ART

Conventionally, there has been used as a technique for a mobile body capable of autonomously traveling to autonomously travel, such as a mobile robot or an autonomous driving vehicle, a technique of self-localization and environmental map creation called simultaneous localization and mapping (SLAM). As the environmental map, an occupancy grid map or a point cloud map created based on the presence or absence of objects in a moving range of a mobile body may be used. In the occupancy grid map, a plane or a space of a moving range is divided into a plurality of sections (cells) and stored, and cell values are assigned to the divided sections in correspondence with the presence or absence of objects. In the point cloud map, objects existing in a plane or a space of a moving range are represented as points (coordinates) discretized in each minute region, and point cloud data that is a set of the points is used as a map.

In order for a mobile body to autonomously travel to the destination, the mobile body determines a moving route from the current location to the destination and travels to the destination along the moving route. At this time, for efficient movement, the mobile body calculates the moving route using a map (existing map) created in advance, and travels while confirming (estimating) self-location on the existing map. Such self-localization on the existing map is an essential technology for autonomous traveling of a mobile body.

As a general technique of self-localization of a mobile body, the mobile body estimates self-location by checking distance data obtained from an output of a distance sensor against an environmental map prepared in advance. As a method of checking the location of a mobile body, for example, there is a method called iterative closest point (ICP). In this method, the location of the mobile body is determined by collating the geometric features of a set of points extracted from point cloud data with characteristic parts of an environmental map (see, for example, Patent Literature 1). In the self-localization method described in Patent Literature 1, the mobile body observes its vicinity by using a distance sensor to acquire a plurality of three-dimensional points indicating an object surface, extracts short-distance three-dimensional points and long-distance three-dimensional points with feature amounts equal to or more than a predetermined threshold based on the observation results, and estimates its self-location by matching between the plurality of extracted three-dimensional points and a plurality of three-dimensional points in an environmental map.

CITATION LIST

Patent Literature

Patent Literature 1: JP-A-2017-083230

SUMMARY OF THE INVENTION

Problems to be Solved by the Invention

However, according to the invention described in Patent Literature 1, the mobile body estimates its self-location by matching of a plurality of three-dimensional points, which causes a problem that the processing time becomes long if the mobile body estimates its self-location in an environment such as an outdoor environment where the number of three-dimensional points (three-dimensional point group data) is large.

An object of the present invention is to provide a self-localization device capable of reducing processing time and accurately estimating its self-location even in an environment where the number of pieces of three-dimensional point group data is large.

Solution to the Problems

A self-localization device of the present invention is a self-localization device that estimates a self-location of a mobile body, the self-localization device including: a detection unit configured to detect distances to objects around the mobile body as three-dimensional point group data; and an estimation unit configured to estimate the self-location of the mobile body. The estimation unit includes: a map generation unit configured to generate a map of surroundings of the mobile body based on the three-dimensional point group data detected by the detection unit; and a storage unit configured to store the map generated by the map generation unit; and a geometric feature extraction unit configured to, based on the map stored in the storage unit, extract at least one type of geometric feature among three types of geometric features of plane, straight line, and sphere as a current geometric feature from a current map as a map of surroundings of a current location of the mobile body, and also as a past geometric feature from a past map as a map of surroundings of a past location of the mobile body; and a self-location calculation unit configured to select two or three current geometric features from among the current geometric features extracted by the geometric feature extraction unit, select a same type and a same number of past geometric features as the selected current geometric features from among the past geometric features extracted by the geometric feature extraction unit, to form sets of geometric features, the self-location calculation unit being configured to calculate self-locations in the past map based on the set of geometric features; and a self-location evaluation unit configured to evaluate a degree of coincidence between the current map and the past map for each set of geometric features based on the self-locations calculated by the self-location calculation unit, and select the self-location with a high degree of coincidence.

According to this configuration, since the self-location calculation unit uses geometric features significantly smaller in number than three-dimensional points, the number of combinations thereof is small. In the case of obtaining the self-location using the three-dimensional points, three three-dimensional points are selected from each of the current map and the past map, and the self-location is calculated using the set of selected three-dimensional points. Since there are an enormous number (several thousands to several tens of thousands) of three-dimensional points, the number of combinations thereof is also enormous, and it takes a lot of processing time to obtain a set with a high degree of coincidence from among the three-dimensional points. On the other hand, the number of geometric features in the present invention is smaller (several to several hundreds) than that of three-dimensional points, and the number of combinations is also smaller. Therefore, the self-localization device can reduce the processing time even when estimating the self-location in an environment where the number of pieces of three-dimensional point group data is large.

In the present invention, the self-location evaluation unit preferably extracts a group of spheres from each of the current map and the past map, and evaluates the degree of coincidence between the current map and the past map for each set of geometric features on the basis of the group of spheres.

According to this configuration, the self-location evaluation unit extracts a group of spheres from each of the current map and the past map, and evaluates the degree of coincidence between the current map and the past map for each set of geometric features based on the groups of spheres. Therefore, it is possible to evaluate the degree of coincidence between the current map and the past map for each set of geometric features based on the groups of spheres smaller in number than the three-dimensional point group data. Therefore, the self-localization device can further reduce the processing time.

In the present invention, with respect to the self-location with a degree of coincidence higher than a predetermined threshold, the self-location evaluation unit preferably extracts an increased number of sphere groups from each of the current map and the past map, and evaluates the degree of coincidence between the current map and the past map again for each set of geometric features on the basis of the sphere groups.

According to this configuration, the self-location evaluation unit extracts an increased number of groups of spheres from each of the current map and the past map for the self-location with a higher degree of coincidence than a predetermined threshold, and evaluates the degree of coincidence between the current map and the past map again for each set of geometric features on the basis of the sphere groups. Therefore, it is possible to narrow down the self-location with a higher degree of coincidence than the predetermined threshold while gradually increasing the number of sphere groups. Therefore, the self-localization device can estimate the self-location with higher accuracy.

In the present invention, the self-location evaluation unit preferably evaluates the degree of coincidence between the current map and the past map for each set of geometric features on the basis of the sphere group, selects the self-location with a high degree of coincidence, and then, further estimates the self-location on the basis of the selected self-location such that the degree of coincidence between the three-dimensional point group data related to the current map and the three-dimensional point group data related to the past map becomes high.

According to this configuration, the self-location evaluation unit evaluates the degree of coincidence between the current map and the past map for each set of geometric features on the basis of the sphere groups, selects the self-location with a high degree of coincidence, and then further estimates the self-location on the basis of the selected self-location such that the degree of coincidence between the three-dimensional point group data related to the current map and the three-dimensional point group data related to the past map becomes high. Therefore, the self-localization device can reduce the processing time as compared with the case of estimating the self-location on the basis of the three-dimensional point group data from the beginning, and can estimate the self-location with high accuracy.

In the present invention, the self-location calculation unit determines whether there is consistency between the angle or the distance between the current geometric features included in the set of geometric features and the angle or the distance between the past geometric features included in the set of geometric features. When determining that there is no consistency, the self-location calculation unit preferably does not calculate the self-locations in the past map on the basis of the set of geometric features.

Since the consistency between the angle or distance between the current geometric features included in the set of geometric features and the angle or distance between the past geometric features included in the set of geometric features does not change even when the coordinate transformation is performed to calculate the self-locations in the past map, it is considered that the degree of coincidence between the current map and the past map is low when such a degree of coincidence is evaluated based on the self-locations calculated on the basis of the set of geometric features having no consistency.

According to the present invention, the self-location calculation unit determines whether there is consistency between the angle or the distance between the current geometric features included in the set of geometric features and the angle or the distance between the past geometric features included in the set of geometric features. When determining that there is no consistency, the self-location calculation unit does not calculate the self-locations in the past map on the basis of the set of geometric features. Therefore, the self-localization device can further reduce the processing time.

In the present invention, in a case of selecting current geometric features and past geometric features as a set of geometric feature, the self-location calculation unit preferably selects an angle formed by planes, an angle formed by straight lines, and an angle formed by a plane and a straight line in the geometric features to be equal to or larger than a predetermined angle or more.

If the angle between planes, the angle between straight lines, and the angle between a plane and a straight line in the geometric features are close to parallel, the self-location calculation unit may not be able to appropriately calculate the self-locations in the past map on the basis of the set of geometric features.

According to the present invention, in the case of selecting the current geometric feature and the past geometric feature as a set of geometric features, the self-location calculation unit selects the set of geometric features such that the angle between planes, the angle between straight lines, and the angle between a plane and a straight line in the geometric features become equal to or larger than a predetermined angle. Therefore, the self-location calculation unit can appropriately calculate the self-locations in the past map on the basis of the set of geometric features. The predetermined angle is desirably an angle that is not clearly parallel, and is desirably 30 degrees or more, for example.

In the present invention, it is preferable that the self-location calculation unit determines whether the current geometric features included in the set of geometric features and the past geometric features included in the set of geometric features include a ground plane as a plane corresponding to the ground. When determining that the ground plane is included, the self-location calculation unit calculates the self-locations in the past map by associating the ground planes in the set of geometric features with each other.

According to this configuration, the self-location calculation unit determines whether the current geometric feature included in the set of geometric features and the past geometric feature included in the set of geometric features include a ground plane as a plane corresponding to the ground. When determining that the ground plane is included, the self-location calculation unit calculates the self-locations in the past map by associating the ground planes with each other in the set of geometric features. Therefore, if the set of geometric features includes a plurality of planes, the self-localization device can reduce the number of combinations of planes, and consequently, can further reduce the processing time.

In the present invention, in the case of selecting the current geometric feature of plane and sphere and the past geometric feature of plane and sphere as a set of geometric features, the self-location calculation unit determines whether the current geometric feature included in the set of geometric features and the past geometric feature included in the set of geometric features include a ground plane as a plane corresponding to the ground. When determining that the ground plane is included, the self-location calculation unit preferably selects only the sphere located at a predetermined height from the ground plane.

According to this configuration, in the case of selecting the current geometric feature of plane and sphere and the past geometric feature of plane and sphere as a set of geometric features, the self-location calculation unit determines whether the current geometric feature included in the set of geometric features and the past geometric feature included in the set of geometric features include a ground plane as a plane corresponding to the ground. When determining that the ground plane is included, the self-location calculation unit selects only the sphere located at a predetermined height from the ground plane. Therefore, if the ground plane is included in the set of geometric features, the self-localization device can reduce the number of selected spheres, and consequently, can further reduce the processing time.

DESCRIPTION OF THE EMBODIMENTS

Hereinafter, an embodiment of the present invention will be described with reference to the drawings.

Figure 1:
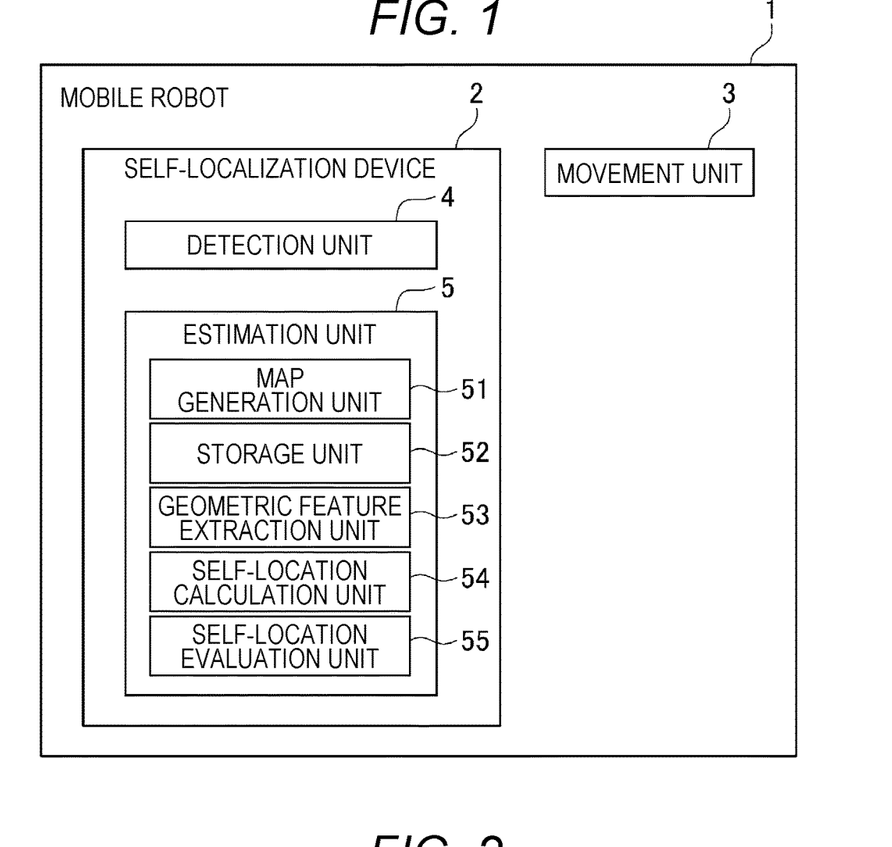
FIG. 1 is a diagram illustrating a configuration of a self-localization device of a mobile robot according to an embodiment of the present invention.

FIG. 1 is a diagram illustrating a configuration of a self-localization device of a mobile robot according to the embodiment of the present invention. In the present embodiment, the location (translation component) and direction (rotation component) of the mobile robot 1 in the three-dimensional space are collectively called self-location.

The mobile robot 1 is a mobile body capable of autonomous traveling. As illustrated in FIG. 1, the mobile robot 1 includes a self-localization device 2 that estimates the self-location of the mobile robot 1, and a movement unit 3 that includes a drive unit (not illustrated) such as a motor and wheels (not illustrated) rotationally driven by the drive unit, to cause the mobile robot 1 to autonomously travel.

The self-localization device 2 includes a detection unit 4 that detects distances to objects in the surrounding area of the mobile robot 1 as three-dimensional point group data, and an estimation unit 5 that estimates the self-location of the mobile robot 1.

The detection unit 4 includes a three-dimensional laser scanner or light detection and ranging (LIDAR) that detects the presence or absence of an object by irradiating the surrounding area of the mobile robot 1 with a laser beam, and acquires three-dimensional point group data representing the surrounding shape. The three-dimensional laser scanner irradiates the surrounding area with a laser beam while rotating a device (or a mirror) such as an infrared laser around the center of the sensor, and measures the presence or absence of an object and the distance to the object at every predetermined angle. If an object is present, the position where the laser beam hit the object is obtained in the form of distance and direction from the sensor center. From the distance and direction, a three-dimensional point $(x, y, z)^T$ in the sensor coordinate system with the sensor center as the origin is obtained.

Therefore, when a plurality of such laser devices is loaded and rotated along the sensor central axis, three-dimensional point group data distributed three-dimensionally can be obtained. In the case of using a single laser device, three-dimensional point group data can be obtained by performing scanning with laser beams emitted in both longitudinal and lateral directions.

In the detection unit 4, three-dimensional point group data obtained in one cycle (for example, one rotation at 360°) of the laser scanner is called scan data or simply as scan, and is used as a unit of processing.

The estimation unit 5 includes a central processing unit (CPU), a memory, and the like, and executes information processing according to a predetermined program stored in the memory. The estimation unit 5 includes a map generation unit 51, a storage unit 52, a geometric feature extraction unit 53, a self-location calculation unit 54, and a self-location evaluation unit 55.

The map generation unit 51 generates a map of the surrounding area of the mobile robot 1 based on the three-dimensional point group data detected by the detection unit 4.

The storage unit 52 stores the map generated by the map generation unit 51. The storage unit 52 may store the three-dimensional point group data detected by the detection unit 4 in addition to the map generated by the map generation unit 51.

On the basis of the map stored in the storage unit 52, the geometric feature extraction unit 53 extracts at least one type of geometric feature among three types of geometric features of plane, straight line, and sphere, as a current geometric feature from a current map that is a map of the surrounding area of the current location of the mobile robot 1, and also as a past geometric feature from a past map that is a map of the surrounding area of the past location of the mobile robot 1.

Figure 2:
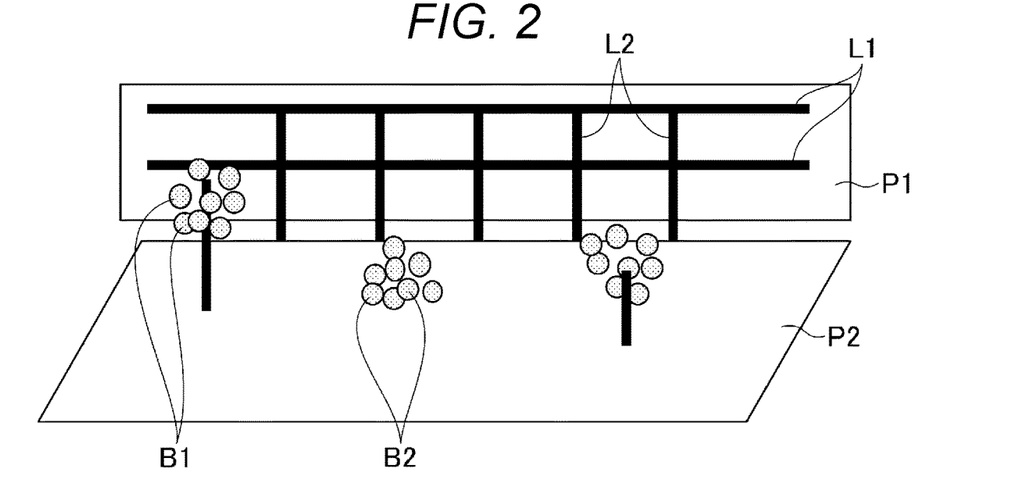
FIG. 2 is a diagram schematically illustrating three types of geometric features of plane, straight line, and sphere.

FIG. 2 is a diagram schematically illustrating three types of geometric features of plane, straight line, and sphere.

In the present embodiment, as illustrated in FIG. 2, the geometric feature is a generic name of figures (plane, straight line, and sphere) having the geometric features extracted from the three-dimensional point group data detected by the detection unit 4.

A geometric feature (geometric feature P) of plane (P) is extracted by connecting flat portions based on the three-dimensional point group data detected by the detection unit 4, such as P1 and P2 in FIG. 2. The geometric feature of plane can be extracted using, for example, Hough transform, random sample consensus (RANSAC), principal component analysis, or the like.

A geometric feature (geometric feature L) of straight line (L) is extracted by connecting linear portions based on the three-dimensional point group data detected by the detection unit 4, such as L1 and L2 in FIG. 2. Similarly to the geometric feature of plane, the geometric feature of straight line can be extracted using, for example, Hough transform, RANSAC, principal component analysis, or the like.

A geometric feature (geometric feature B) of sphere (B) is obtained by extracting three-dimensional point group data included in a sphere with a radius R centered on an arbitrary three-dimensional point C, with the arbitrary point C as a representative, on the basis of the three-dimensional point group data detected by the detection unit 4, such as B1 and B2 in FIG. 2. The geometric feature B is represented by the representative point C. The geometric feature B may be extracted with the gravity center of the three-dimensional point group included in the sphere with the radius R as a representative. The sphere of the present invention is not limited to a true sphere, and includes an elliptical sphere, a cube, or the like. In other words, the geometric feature B represents a three-dimensional figure having a specific space by one representative point.

The self-location calculation unit 54 selects two or three current geometric features from among the current geometric features extracted by the geometric feature extraction unit 53, and selects the same type and the same number of past geometric features as the selected current geometric features, from among the past geometric features extracted by the geometric feature extraction unit 53, to form a set of geometric features, and calculates the self-locations in the past map on the basis of the set of geometric features.

The self-location evaluation unit 55 evaluates the degree of coincidence between the current map and the past map for each set of geometric features on the basis of the self-locations calculated by the self-location calculation unit 54, and selects the self-location with a high degree of coincidence.

Hereinafter, a concept that the self-location calculation unit 54 calculates the self-locations of the mobile robot 1 and the self-location evaluation unit 55 selects the self-location with a high degree of coincidence will be described with reference to FIGS. 3 to 8.

Figure 3:
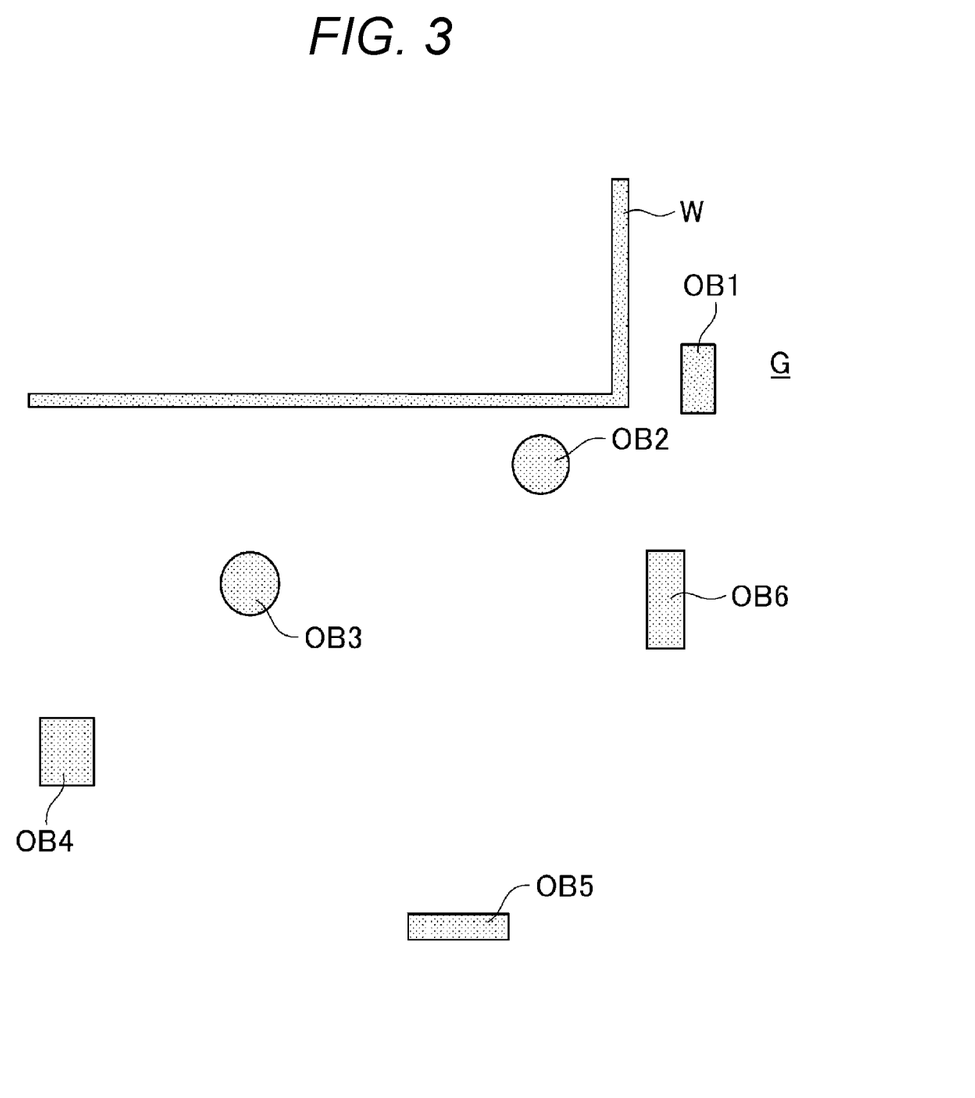
FIG. 3 is a schematic diagram illustrating an actual environment in which the mobile robot travels in a plane as viewed from vertically above.

FIG. 3 is a schematic diagram illustrating an actual environment in which the mobile robot travels in a plane as viewed from vertically above.

As illustrated in FIG. 3, the actual environment in which the mobile robot 1 travels includes a ground G, a wall W erected on the ground G, and objects OB1 to OB6 such as trees and obstacles existing on the ground G.

By traveling in such a real environment, the mobile robot 1 causes the map generation unit 51 to generate a map around the mobile robot 1 on the basis of the three-dimensional point group data detected by the detection unit 4.

Figure 4:
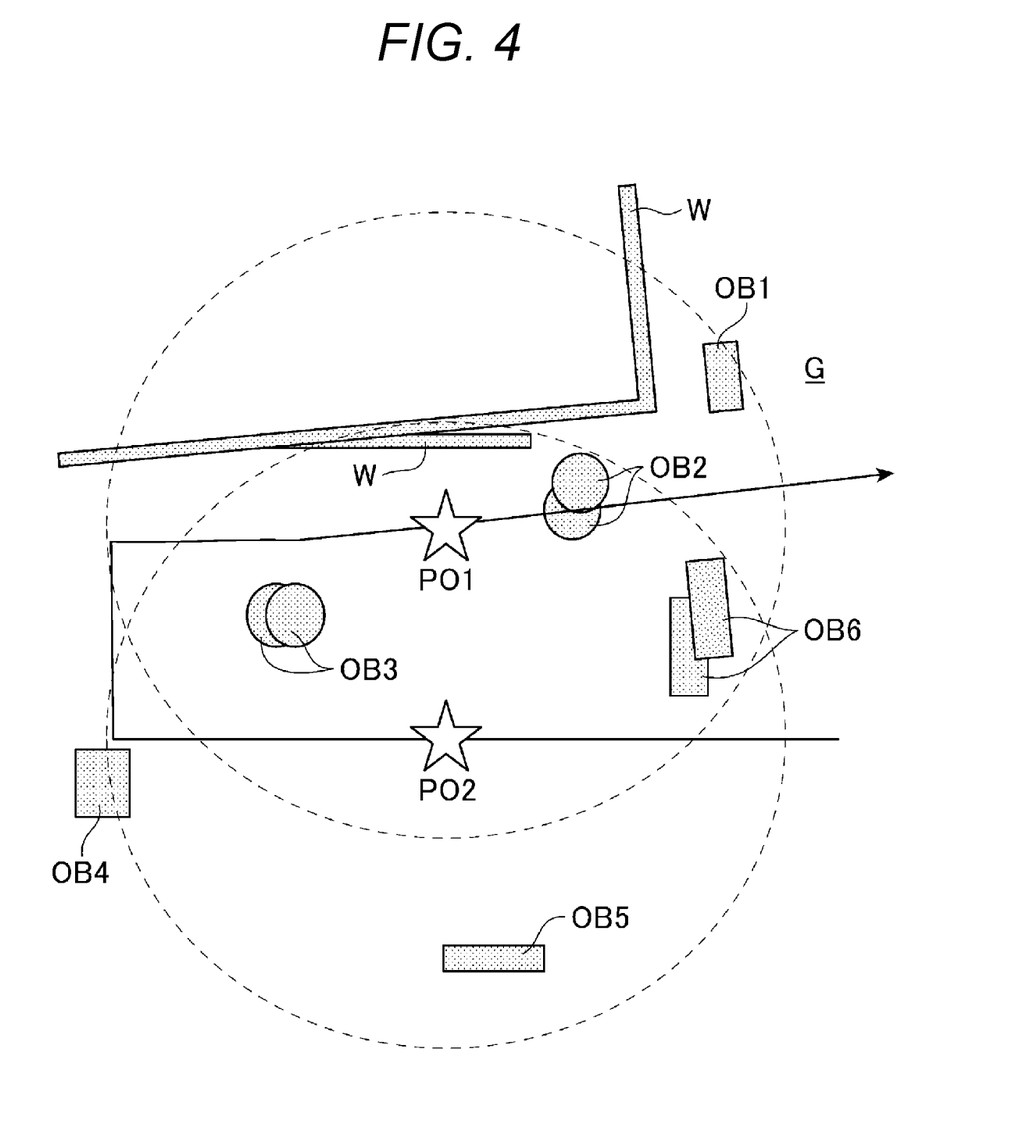
FIG. 4 is a schematic diagram illustrating an overall map generated by combining scanned images using an alignment method such as ICP, for example, in one travel of the mobile robot.

FIG. 4 is a schematic diagram illustrating an overall map generated by combining scanned images using an alignment method such as ICP, for example, in one travel of the mobile robot. The arrow in FIG. 4 indicates the travel locus of the mobile robot.

In this example, the mobile robot passes a position PO2 and then a position PO1, but since these positions are close, the same object is measured by a three-dimensional laser scanner. However, as the mobile robot moves, errors in the position of the mobile robot accumulate. Thus, the object measured at the position PO2 and the object measured at the position PO1 are the same object but are recorded on the map with a slight displacement from each other.

The displacement of the object is clearly drawn in FIG. 4, but actually, several three-dimensional point groups overlap to distort the map in many cases.

In order to eliminate such distortion of the map, partial maps extracted from the entire map are used. Here, the position PO1 is set as a current position, and a partial map of surrounding area of the position PO1 is referred to as a current map. In FIG. 4, a dotted circle centered on PO1 constitutes a current map. Further, the position PO2 is set as a past position, and a partial map of surrounding area of the position PO2 is referred to as a past map. In FIG. 4, a dotted circle centered on PO2 constitutes a past map.

Figure 5:
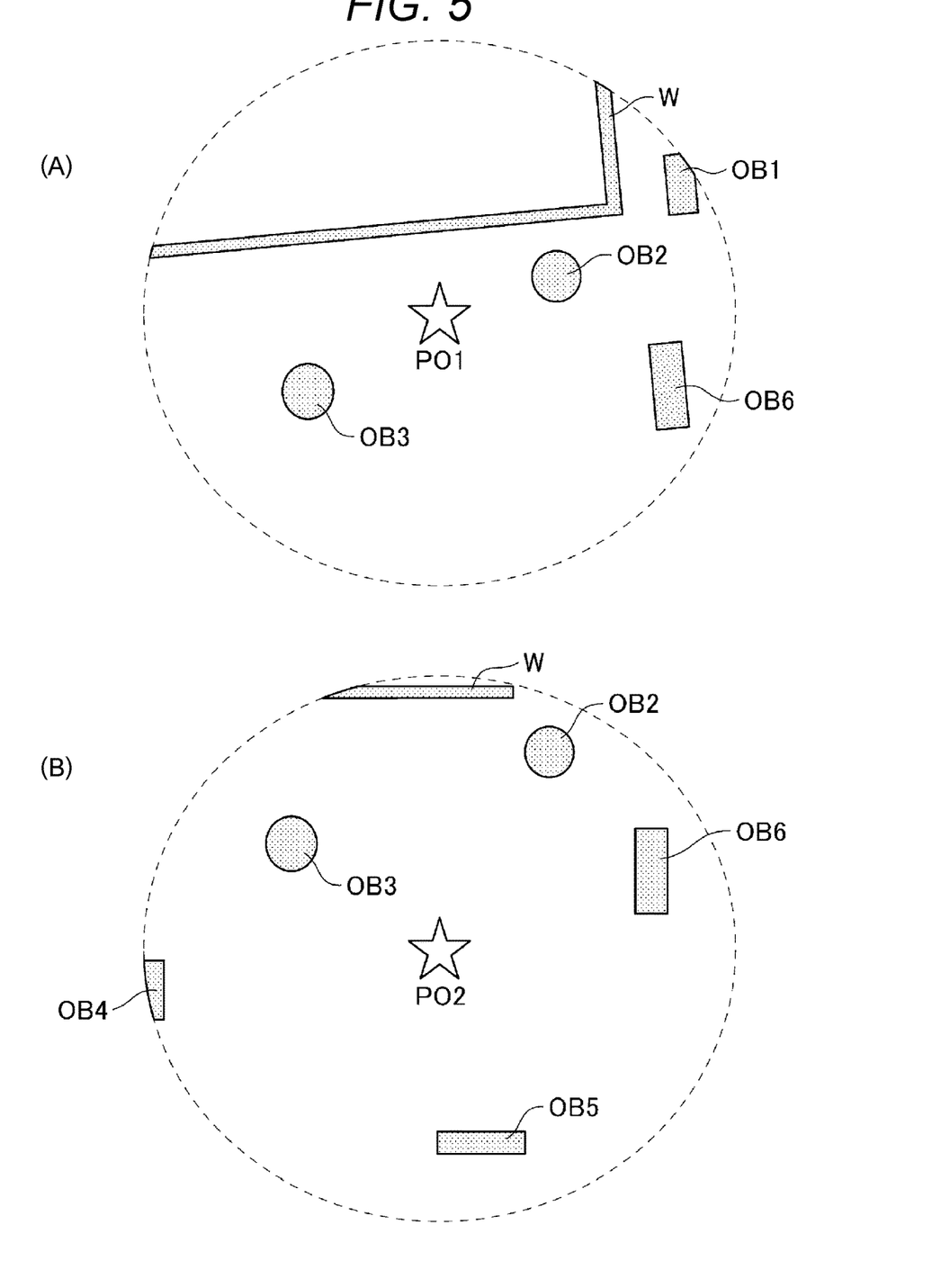
FIG. 5 is a schematic diagram illustrating a current map and a past map.

FIG. 5 is a schematic diagram illustrating the current map and the past map. FIG. 5 (A) is the current map obtained by cutting out the surrounding area of the position PO1 from the entire map of FIG. 4, and FIG. 5 (B) is the past map obtained by cutting out the surrounding area of the position PO2 from the entire map of FIG. 4. The size of the range of the current map and the size of the range of the past map are not necessarily the same. In addition, the coordinate system of the current map and the coordinate system of the past map are different from each other.

The mobile robot 1 determines the self-location at the center PO1 of the current map such that the current map and the past map match each other. In the present embodiment, the self-location calculation unit 54 calculates the self-locations of the mobile robot 1, and the self-location evaluation unit 55 selects the self-location with a high degree of coincidence between the current map and the past map.

Figure 6:
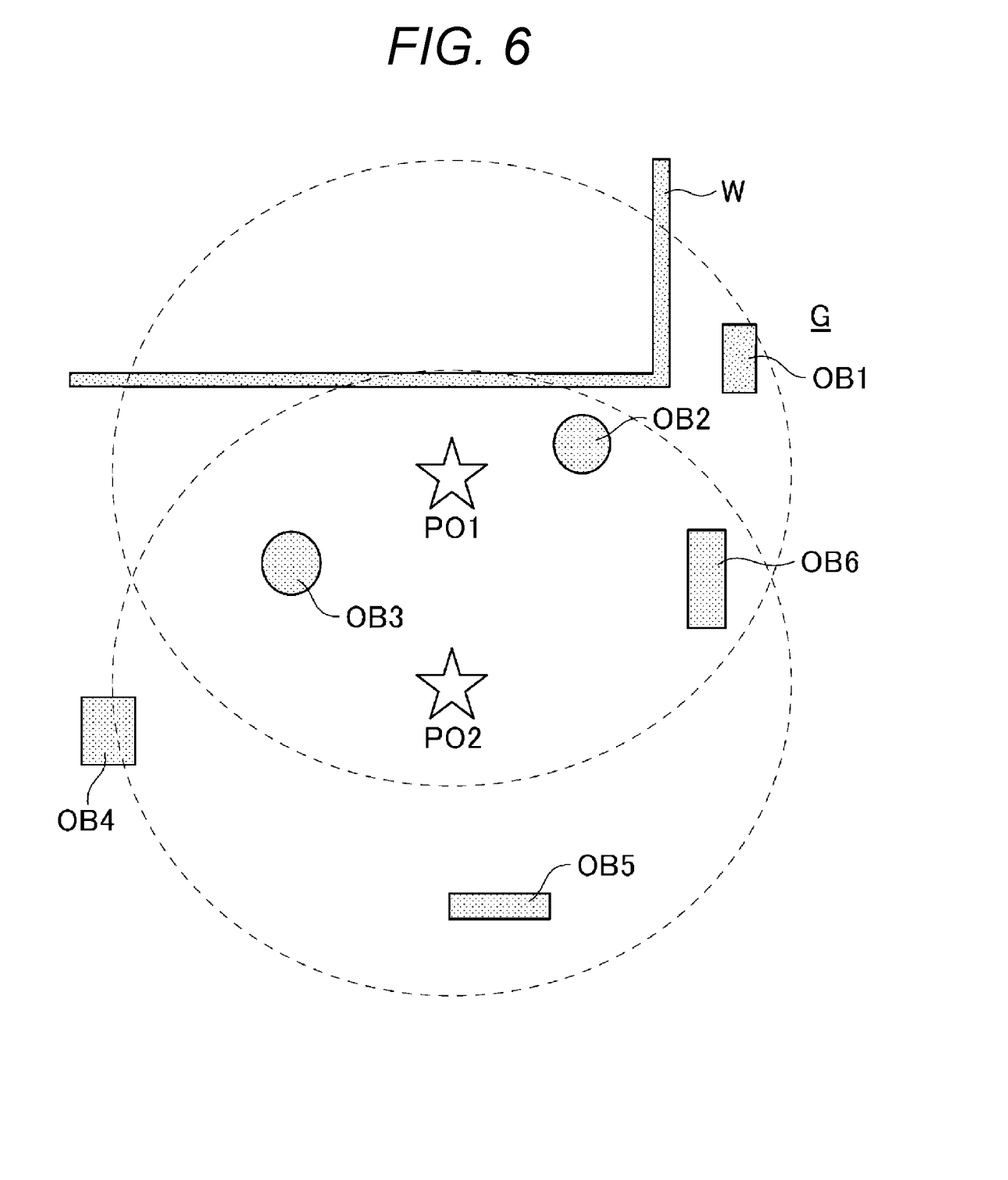
FIG. 6 is a schematic diagram illustrating an overall map obtained by combining the current map and the past map while correcting an arrangement in the current map using a self-location with a high degree of coincidence.

FIG. 6 is a schematic diagram illustrating an overall map obtained by combining the current map and the past map while correcting an arrangement in the current map using a self-location with a high degree of coincidence.

As above, in the present embodiment, as illustrated in FIG. 6, the estimation unit 5 estimates the self-location of the mobile robot 1 by superimposing the three-dimensional point group data of the current map and the past map without displacement.

Figure 7:
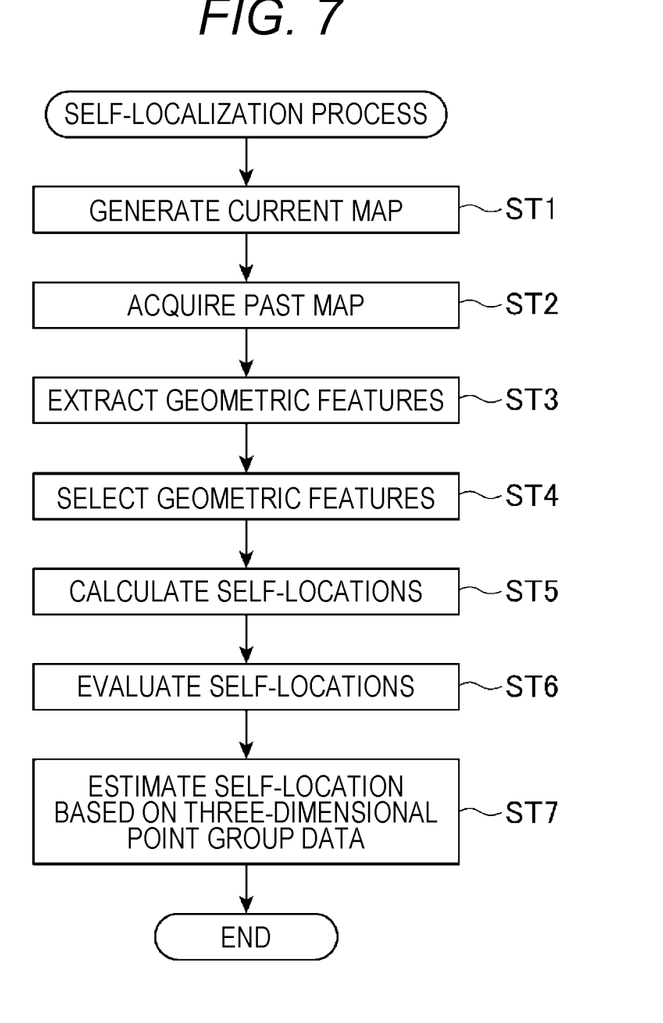
FIG. 7 is a flowchart illustrating a flow of a self-localization process by the self-localization device of the mobile robot.

FIG. 7 is a flowchart illustrating a flow of a self-localization process by the self-localization device of the mobile robot.

In the self-localization process by the self-localization device 2 of the mobile robot 1, the estimation unit 5 executes processing in steps ST1 to ST7 as illustrated in FIG. 7.

On the basis of the three-dimensional point group data detected by the detection unit 4, the map generation unit 51 generates a current map as a map of surrounding area of current location of the mobile robot 1, and stores the current map in the storage unit 52 (step ST1: current map generation step).

Next, the estimation unit 5 acquires a past map as a map of surrounding area of the past position of the mobile robot 1, from the storage unit 52 (step ST2: past map acquisition step).

As the past map, for example, the estimation unit 5 may select the past position close to the current position, following the movement locus of the mobile robot 1 and acquire a map of surrounding area of the past position. Alternatively, the estimation unit 5 may select a region in a predetermined range from a whole map created so far (environmental map created by integrating the past map and the current map) to acquire a map of surrounding area of the past position.

After the current map is generated in the current map generation step ST1 and the past map is acquired in the past map acquisition step ST2, the geometric feature extraction unit 53 extracts three types of geometric features of plane (P), straight line (L), and sphere (B) as current geometric features from the current map and as past geometric features from the past map, based on the maps stored in the storage unit 52 (step ST3: geometric feature extraction step).

In the present embodiment, the geometric feature extraction unit 53 extracts three types of geometric features as the current geometric features and the past geometric features, but may extract one type of geometric features or two types of geometric features. In short, the geometric feature extraction unit extracts at least one type of geometric features among three types of geometric features of plane, straight line, and sphere as the current geometric features and the past geometric features.

The self-location calculation unit 54 selects two or three current geometric features from among the current geometric features extracted by the geometric feature extraction unit 53, and selects the same type and the same number of past geometric features as the selected current geometric features, from among the past geometric features extracted by the geometric feature extraction unit 53, thereby to create a set of the current geometric features and the past geometric features (step ST4: geometric feature selection step). For example, a geometric feature PPL (two planes P and one straight line L) is extracted from the current map, and a geometric feature PPL is also extracted from the past map to create a set of two geometric features PPL.

Then, the self-location calculation unit 54 calculates where the current self-location (PO1 in FIG. 4) is located on the past map, on the basis of the set of geometric features (step ST5: self-location calculation step).

In this calculation, it is necessary to correctly associate two or three current geometric features with the same type and the same number of past geometric features. However, since it is often unknown in advance which geometric features correspond with each other, the self-location is calculated for each combination of geometric features, and the correctness of the self-location is verified.

For example, in a case of calculating the self-location from the current geometric feature P1P2L1 and the past geometric feature P3P4L2, there are two possible combinations. One is a combination of P1 and P3, P2 and P4, and L1 and L2, and the other is a combination of P1 and P4, P2 and P3, and L1 and L2.

In a case of selecting current geometric features and past geometric features as a set of geometric features, the self-location calculation unit 54 selects an angle formed by planes, an angle formed by straight lines, and an angle formed by a plane and a straight line in the geometric features to be equal to or larger than a predetermined angle or more (for example, 30 degrees or more). This is because, for example, taking the geometric feature PPL described above as an example, the self-location may not be uniquely calculable from a set of geometric features if two planes are parallel or if a plane and a straight line are parallel.

In the present embodiment, the current geometric features and the past geometric features are selected such that the angle between the planes, the angle between straight lines, and the angle between the plane and the straight line in the geometric features are equal to or larger than a predetermined angle, but such a limitation may not be provided.

In a case of selecting current geometric features including a plane and past geometric features including a plane as a set of geometric features, the self-location calculation unit 54 determines whether the current geometric features included in the set of geometric features and the past geometric features included in the set of geometric features include a ground plane as a plane corresponding to the ground. When determining that the ground plane is included, the self-location calculation unit 54 selects only spheres located at a predetermined height from the ground plane.

In the present embodiment, since the mobile robot 1 includes the movement unit 3 having wheels, it is relatively easy to determine whether the ground plane is included by using a sensor or the like.

In the present embodiment, when determining that the ground plane is included, the self-location calculation unit 54 selects only the spheres located at the predetermined height from the ground plane, but such a limitation may not be provided.

There are various methods for calculating the self-location on the past map from a set of current geometric features and past geometric features. Among them, a method in which to calculate the self-locations by dividing into a rotation component and a translation component is simple and convenient.

First, the rotation component is calculated based on a set of two or more direction vectors. Assuming that the direction vector of one current geometric feature is $d_i^r$, the direction vector of one past geometric feature corresponding to the current geometric feature is $d_i^c$, and a matrix representing the rotation component of the self-location to be obtained is R, a relationship therebetween is expressed by the following formula (1). With two or more of these expressions, the rotation component can be calculated.

[Mathematical Formula 1]

$$d_i^r = R d_i^c \qquad (1)$$

The rotation component is calculated by obtaining the rotation matrix R with C minimized in the following formulas (2) and (3) in consideration of error in the three-dimensional point group data.

[Mathematical Formula 2]

$$C = \sum_{i=1}^{m} \|d_i^r - R d_i^c\|^2 \qquad (2)$$

$$\sum_{i=1}^{m} d_i^r d_i^{cT} \qquad (3)$$

The direction vectors include a normal vector of a plane, a direction vector of a straight line, and a direction vector of a straight line connecting two spheres. For example, in a case of selecting a geometric feature PPP (three planes P), a geometric feature PPL (two planes P and one straight line L), and a geometric feature PLL (one plane P and two straight lines L), the self-location calculation unit 54 calculates the rotation component using three direction vectors. For example, in a case of selecting a geometric features PBB (one plane P and two spheres B), the self-location calculation unit 54 calculates the rotation component using two direction vectors (a normal vector of the plane and a direction vector of a straight line connecting the two spheres). In a case of selecting a geometric feature LB (one straight line L and one sphere B), the self-location calculation unit 54 calculates the rotation component using two direction vectors (a direction vector of the straight line and a direction vector of a perpendicular line from the sphere to the straight line). Note that m in the formulas (2) and (3) is the number of direction vectors.

Next, the translation component is calculated according to the types of the current geometric feature and the past geometric feature. The direction vector of the current geometric feature and the three-dimensional point group data in the current map are rotationally transformed in advance using the rotation matrix R obtained earlier. According to this, the direction vectors of the geometric features corresponding to each other are the same. Then, the translation component is calculated based on the following three formulas for each type of the current geometric feature and the past geometric feature, where the translation vector of the self-location to be obtained is t.

In the case of the geometric feature of plane (P), assuming that a normal vector thereof is $n_i$, one point on the plane of the current map is $c_i^c$, and one point on the plane of the past map is $c_i^r$, the relationship therebetween is as expressed by formulas (4) and (5). Here, p is an arbitrary point on the plane. In addition, formula (6) is obtained on the basis of the formulas (4) and (5).

[Mathematical Formula 3]

$$n_i \cdot (p - c_i^r) = 0 \quad (4)$$

$$n_i \cdot (p - c_i^c - t) = 0 \quad (5)$$

$$n_i \cdot t = n_i (c_i^c - c_i^r) \quad (6)$$

In the case of the geometric feature of straight line (L), assuming that a direction vector thereof is $d_i$, one point on the straight line in the current map is $c_i^c$, and one point on the straight line in the past map is $c_i^r$, the relationship therebetween is as expressed by formulas (7) and (8). Here, p is an arbitrary point on the straight line, and u and v are parameters of the straight line equation. In addition, formula (9) is obtained on the basis of the formulas (7) and (8).

[Mathematical Formula 4]

$$p = d_i u + c_i^c \quad (7)$$

$$p = d_i v + c_i^r + t \quad (8)$$

$$d_i \times t = d_i \times (c_i^c - c_i^r) \quad (9)$$

In the case of the geometric feature of sphere (B), assuming that the representative position of the sphere in the current map is $c_i^c$ and the representative position of the sphere in the past map is $c_i^r$, the relationship therebetween is as expressed by formula (10).

[Mathematical Formula 5]

$$t = c_i^c - c_i^r \quad (10)$$

The following formula (11), which is simultaneous equations regarding the translation vector t, is obtained on the basis of the formulas (6), (9), and (10) according to the types of the current geometric feature and the past geometric feature.

[Mathematical Formula 6]

$$At = q \quad (11)$$

Here, A is a matrix in which the left sides of the formulas (6), (9), and (10) are stacked, and q is a vector in which the right sides of the formulas (6), (9), and (10) are stacked. The simultaneous equations can be solved for three variables of the translation vector t=(x, y, z) if two or three current geometric features are selected and the same type and the same number of past geometric features as the number and type of the selected current geometric feature are selected as a set of geometric features.

The self-location calculation unit 54 determines whether there is consistency between the angle or the distance between the current geometric features included in the set of geometric features and the angle or the distance between the past geometric features included in the set of geometric features. When determining that there is no consistency, the self-location calculation unit 54 does not calculate the self-locations in the past map on the basis of the set of geometric features.

Figure 8:
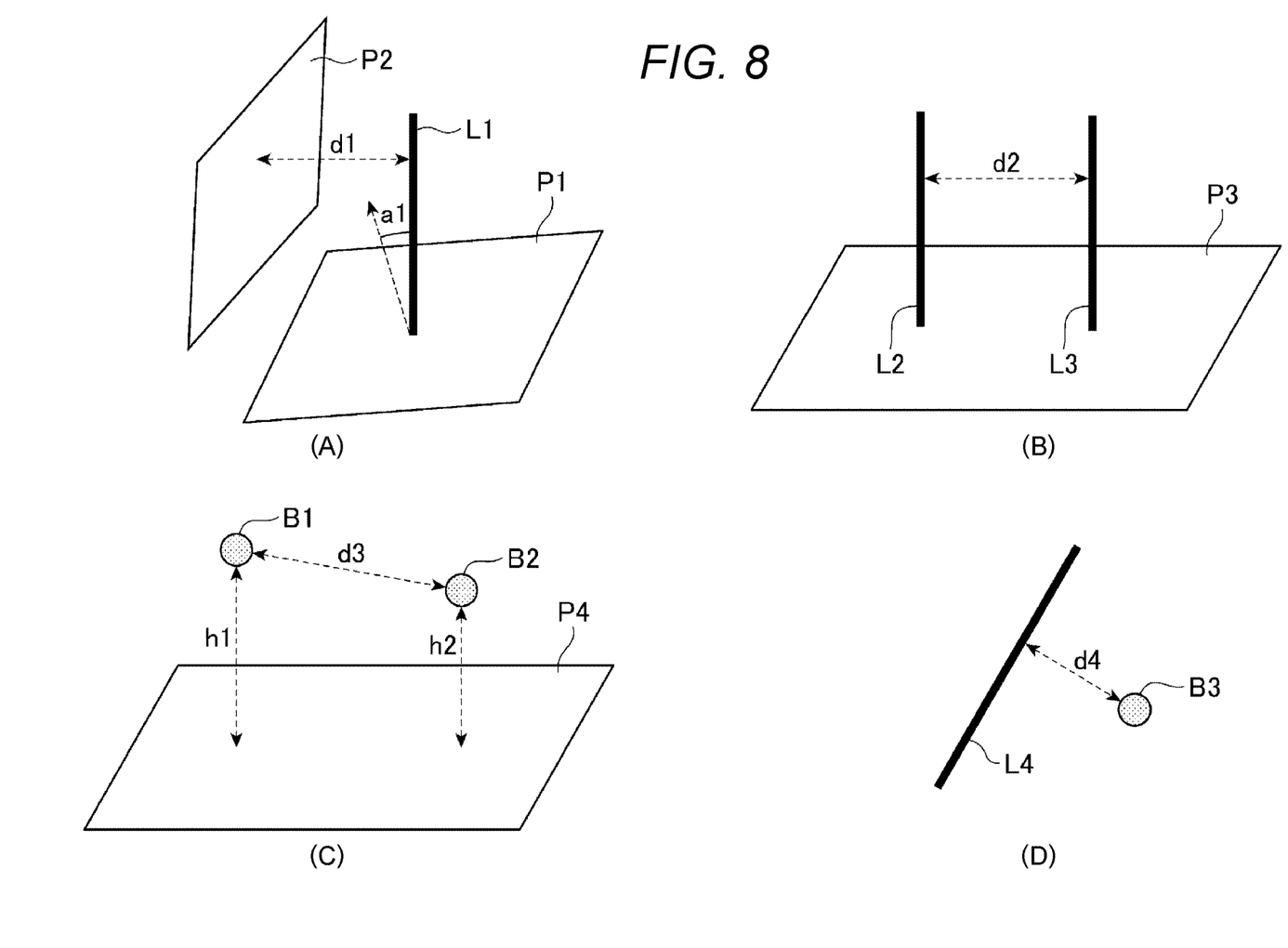
FIG. 8 is a schematic diagram illustrating examples of an angle or a distance between geometric features.

FIG. 8 is a schematic diagram illustrating examples of an angle or a distance between geometric features.

If the geometric feature extraction unit 53 has extracted the geometric feature PPL, as illustrated in FIG. 8 (A), the angle or the distance between geometric features for determining the consistency may be an angle formed by the plane P1 and the plane P2, an angle a1 formed by the plane P1 and the straight line L1, or a distance d1 between the plane P2 and the straight line L1.

If the geometric feature extraction unit 53 has extracted the geometric feature PLL, as illustrated in FIG. 8 (B), the angle or the distance between geometric features for determining the consistency may be an angle formed by the plane P3 and the straight lines L2 and L3, or a distance d2 between the straight line L2 and the straight line L3.

If the geometric feature extraction unit 53 has extracted the geometric feature PBB, as illustrated in FIG. 8 (C), the angle or the distance between geometric features for determining the consistency may be a distance h1 or h2 between the plane P4 and the sphere B1 or B2, or a distance d3 between the spheres B1 and B2.

If the geometric feature extraction unit 53 has extracted the geometric feature LB, as illustrated in FIG. 8 (D), the angle or the distance between geometric features for determining the consistency may be a distance d4 between the straight line L4 and the sphere B3.

In the present embodiment, if the self-location calculation unit 54 determines that there is no consistency between the angle or the distance between the current geometric features included in the set of geometric features and the angle or the distance between the past geometric features included in the set of geometric features, the self-location calculation unit 54 does not calculate the self-locations in the past map on the basis of the set of geometric features. Alternatively, the self-location calculation unit 54 may calculate the self-locations in the past map on the basis of the set of geometric features.

The self-location calculation unit 54 determines whether the current geometric features included in the set of geometric features and the past geometric features included in the set of geometric features include a ground plane as a plane corresponding to the ground. When determining that the ground plane is included, the self-location calculation unit 54 calculates the self-locations in the past map by associating the ground planes with each other in the set of geometric features.

In the present embodiment, when determining that the ground plane is included, the self-location calculation unit 54 calculates the self-locations in the past map by associating the ground planes with each other in the set of geometric features. However, the self-location calculation unit 54 may not calculate the self-locations in the past map by associating the ground planes with each other.

After the self-location in the past map is calculated in the self-location calculation step ST5, the self-location evaluation unit 55 evaluates the degree of coincidence between the current map and the past map for each set of geometric features on the basis of the self-locations calculated by the self-location calculation unit 54, and selects the self-location with a high degree of coincidence (step ST6: self-location evaluation step).

Specifically, the self-location evaluation unit 55 extracts a group of spheres from each of the current map and the past map, and evaluates the degree of coincidence between the current map and the past map for each set of geometric features on the basis of the group of spheres.

First, the self-location evaluation unit 55 sets the self-location (hypothesis) calculated by the self-location calculation unit 54 as pose, sets the group of spheres in the current map as $P^c$, and sets the group of spheres in the past map as $P^r$.

Then, the self-location evaluation unit 55 evaluates the degree of coincidence between the current map and the past map for each set of geometric features according to the following procedures (A1) to (A5).

(A1) The score S=0.
(A2) $p_i^c \in P^c$ is subjected to coordinate transformation at pose and the resultant is defined as $q_i^c$.
(A3) If a point $P^r$ exists within a radius r of $q_i^c$, S=S+1.
(A4) The steps (A2) and (A3) are repeated at all points of $P^c$.
(A5) If the score S is equal to or larger than a threshold value sthre, it is determined that the self position (hypothesis) is correct.

For the coordinate transformation of $p_i^c$ at pose, the following formula (12) is used. R is a rotation matrix of the pose, and t is a translation vector of pose.

[Mathematical Formula 7]

$$q_i^c = R p_i^c + t \qquad (12)$$

In the present embodiment, the step (A3) is performed by nearest neighbor search using a kd tree. On the other hand, instead of the process (A3), for example, the self-location evaluation unit 55 may adopt a process of obtaining the closest point to $q_i^c$ among the points $P^r$ and updating S on the basis of whether the distance to the point is within the radius r.

In addition, with respect to the self-location with a degree of coincidence higher than a predetermined threshold, the self-location evaluation unit 55 extracts by an increased number of sphere groups from each of the current map and the past map, and evaluates the degree of coincidence between the current map and the past map again for each set of geometric features on the basis of the sphere groups. In other words, the self-location evaluation unit 55 hierarchically evaluates the degree of coincidence while increasing the number of sphere groups according to the following procedures (B1) to (B4).

(B1) The number of sphere groups in the k-th evaluation is defined as $m_k$, and the threshold of the score S is defined as $sthre_k$.
(B2) The steps (A1) to (A5) described above are performed to leave the self-locations (hypothesis) in which the score S is equal to or higher than the threshold $sthre_k$.
(B3) The maximum value $smax_k$ of the scores S of the remaining self-locations (hypothesis) is obtained, and the self-locations (hypothesis) in which the score S is less than ratio×$smax_k$ are deleted.
(B4) $m_k$ is increased to make larger $sthre_k$, and the process returns to the step (B2). Thereafter, the steps (B2) to (B4) are repeated a predetermined number of times.

In the present embodiment, the value of ratio is set to 0.85, but may be set to be different from this value.

Then, the self-location evaluation unit 55 arranges the self-locations (hypotheses) remaining last in order of the score S, and selects the upper self-location (hypothesis) as the self-location with a high degree of coincidence. The number of self-location(s) selected here may be one or two or more. If two or more self-locations are selected, these self-locations may be re-evaluated in self-localization step ST7 described later.

In self-location evaluation step ST6, the self-location evaluation unit 55 evaluates the degree of coincidence between the current map and the past map for each set of geometric features on the basis of the sphere group, selects the self-location with a high degree of coincidence, and then, further estimates the self-location on the basis of the selected self-location such that the degree of coincidence between the three-dimensional point group data related to the current map and the three-dimensional point group data related to the past map becomes high (step ST7: self-localization step).

Specifically, in the self-location evaluation step ST6, the self-location evaluation unit 55 sets, as pose, the self-location (hypothesis) selected as the self-location with a high degree of coincidence, sets the three-dimensional point group data in the current map as $P^c$, and sets the three-dimensional point group data in the past map as $P^r$.

Then, the self-location evaluation unit 55 further estimates the self-location so as to increase the degree of coincidence between the three-dimensional point group data related to the current map and the three-dimensional point group data related to the past map using an alignment method such as ICP.

In the present embodiment, the self-location evaluation unit 55 hierarchically evaluates the degree of coincidences while increasing the number of sphere groups according to the above-described procedures (B1) to (B4). However, the self-location evaluation unit 55 does not necessarily need to hierarchically evaluate the degree of coincidences.

In the present embodiment, in the self-localization step ST7, the self-location evaluation unit 55 further estimates the self-location so as to increase the degree of coincidence between the three-dimensional point group data related to the current map and the three-dimensional point group data related to the past map according to the above-described procedures (A1) to (A5). However, the self-localization step ST7 may be omitted. In this case, in the self-location evaluation step ST6, the self-location selected by the self-location evaluation unit 55 can be estimated as the self-location in the past map.

According to the present embodiment as described above, the following operations and advantageous effects can be achieved.

(1) Since the self-location calculation unit 54 uses geometric features significantly smaller in number than three-dimensional points, the number of combinations thereof is small. In the case of obtaining the self-location using the three-dimensional points, three three-dimensional points are selected from each of the current map and the past map, and the self-location is calculated using the set of selected three-dimensional points. Since there are an enormous number (several thousands to several tens of thousands) of three-dimensional points, the number of combinations thereof is also enormous, and it takes a lot of processing time to obtain a set with a high degree of coincidence from among the three-dimensional points. On the other hand, the number of geometric features in the present embodiment is smaller (several to several hundreds) than that of three-dimensional points, and the number of combinations is also smaller. Therefore, the self-localization device 2 can reduce the processing time even when estimating the self-location in an environment where the number of pieces of three-dimensional point group data is large.

(2) The self-location evaluation unit 55 extracts a group of spheres from each of the current map and the past map, and evaluates the degree of coincidence between the current map and the past map for each set of geometric features based on the groups of spheres. Therefore, it is possible to evaluate the degree of coincidence between the current map and the past map for each set of geometric features based on the groups of spheres smaller in number than the three-dimensional point group data. Therefore, the self-localization device 2 can further reduce the processing time.

(3) The self-location evaluation unit 55 extracts an increased number of groups of spheres from each of the current map and the past map for the self-location with a higher degree of coincidence than a predetermined threshold, and evaluates the degree of coincidence between the current map and the past map again for each set of geometric features on the basis of the sphere groups. Therefore, it is possible to narrow down the self-location with a higher degree of coincidence than the predetermined threshold while gradually increasing the number of sphere groups. Therefore, the self-localization device 2 can estimate the self-location with higher accuracy.

(4) The self-location evaluation unit 55 evaluates the degree of coincidence between the current map and the past map for each set of geometric features on the basis of the sphere groups, selects the self-location with a high degree of coincidence, and then further estimates the self-location on the basis of the selected self-location by using an alignment method such as ICP such that the degree of coincidence between the three-dimensional point group data related to the current map and the three-dimensional point group data related to the past map becomes high. Therefore, the self-localization device 2 can reduce the processing time as compared with the case of estimating the self-location on the basis of the three-dimensional point group data from the beginning, and can estimate the self-location with high accuracy.

(5) The self-location calculation unit 54 determines whether there is consistency between the angle or the distance between the current geometric features included in the set of geometric features and the angle or the distance between the past geometric features included in the set of geometric features. When determining that there is no consistency, the self-location calculation unit 54 does not calculate the self-locations in the past map on the basis of the set of geometric features. Therefore, the self-localization device 2 can further reduce the processing time.

(6) In the case of selecting the current geometric feature and the past geometric feature as a set of geometric features, the self-location calculation unit 54 selects the set of geometric features such that the angle between planes, the angle between straight lines, and the angle between a plane and a straight line in the geometric features become equal to or larger than a predetermined angle (for example, 30 degrees or more). Therefore, the self-location calculation unit 54 can appropriately calculate the self-locations in the past map on the basis of the set of geometric features.

(7) The self-location calculation unit 54 determines whether the current geometric feature included in the set of geometric features and the past geometric feature included in the set of geometric features include a ground plane as a plane corresponding to the ground. When determining that the ground plane is included, the self-location calculation unit 54 calculates the self-locations in the past map by associating the ground planes with each other in the set of geometric features. Therefore, if the set of geometric features includes a plurality of planes, the self-localization device 2 can reduce the number of combinations of planes, and consequently, can further reduce the processing time.

(8) In the case of selecting the current geometric feature of plane and sphere and the past geometric feature of plane and sphere as a set of geometric features, the self-location calculation unit 54 determines whether the current geometric feature included in the set of geometric features and the past geometric feature included in the set of geometric features include a ground plane as a plane corresponding to the ground. When determining that the ground plane is included, the self-location calculation unit 54 selects only the sphere located at a predetermined height from the ground plane. Therefore, if the ground plane is included in the set of geometric features, the self-localization device 2 can reduce the number of selected spheres, and consequently, can further reduce the processing time.

Modifications of Embodiment

Note that the present invention is not limited to the above-described embodiment, and modifications, improvements, and the like within a range in which the object of the present invention can be achieved are included in the present invention.

For example, in the above embodiment, the mobile robot 1 as a mobile body is not specifically exemplified, but the mobile robot can be a service robot or a home robot as an example. More specifically, examples of the mobile body include a cleaning robot, a security robot, a transport robot, and a guide robot. Furthermore, the mobile body may be a self-driving vehicle, a work vehicle, or the like.

In the above embodiment, the mobile robot 1 includes the self-localization device 2, and the self-localization device 2 has the functions of the map generation unit 51 and the like. On the other hand, the mobile body may not include the self-localization device. For example, the self-localization device may be provided in another device that can communicate with the mobile body.

In the above embodiment, the mobile robot 1 includes the movement unit 3. However, the mobile robot 1 may not include the movement unit 3. For example, the mobile robot 1 may be configured to manually move a cart or the like including the self-localization device by the user.

INDUSTRIAL APPLICABILITY

As described above, the present invention can be suitably used for a self-localization device of a mobile body.

LIST OF THE REFERENCE NUMERALS

1 Mobile robot
2 Self-localization device
3 Movement unit
4 Detection unit
5 Estimation unit
51 Map generation unit
52 Storage unit
53 Geometric feature extraction unit
54 Self-location calculation unit
55 Self-location evaluation unit

What is claimed is:

1. A self-localization device that estimates a self-location of a mobile body, the self-localization device comprising:
 a detection unit configured to detect a distance to an object around the mobile body as three-dimensional point group data; and
 an estimation unit configured to estimate the self-location of the mobile body,
 the estimation unit includes:
 a map generation unit configured to generate a current map of surroundings of the mobile body based on the three-dimensional point group data detected by the detection unit;
 a storage unit configured to store the current map generated by the map generation unit;
 a geometric feature extraction unit configured to, based on the current map stored in the storage unit, extract at least one type of geometric feature among three types of geometric features of plane, straight line, and sphere, as a number of current geometric features from the current map, and also as a number of past geometric features from a past map as a map of surroundings of a past location of the mobile body;
 a self-location calculation unit configured to select two or three current geometric features from among the number of current geometric features extracted by the geometric feature extraction unit, select a same type and a same number of past geometric features from the number of past geometric features extracted by the geometric feature extraction unit, to form at least one set of geometric features, the self-location calculation unit being configured to calculate at least one self-location in the past map based on the at least one set of geometric features; and
 a self-location evaluation unit configured to evaluate a degree of coincidence between the current map and the past map for each set of geometric features of the at least one set of geometric features based on the at least one self-location calculated by the self-location calculation unit, and select a self-location of the at least one self-location with a high degree of coincidence;
 wherein the self-location evaluation unit is configured to extract a sphere group from each of the current map and the past map, and evaluates a degree of coincidence between the current map and the past map for each set of geometric features of the at least one set of geometric features based on the sphere group.

2. The self-localization device according to claim 1, wherein the self-location evaluation unit is configured to extract an increased number of sphere groups from each of the current map and the past map for a self-location with a higher degree of coincidence than a predetermined threshold, and is configured to evaluate the degree of coincidence between the current map and the past map again for each set of the geometric features of the at least one set of geometric features based on the sphere groups.

3. The self-localization device according to claim 1, wherein the self-location evaluation unit is configured to evaluate the degree of coincidence between the current map and the past map for each set of geometric features of the at least one set of geometric features based on the sphere groups, selects a self-location with a high degree of coincidence, and then, further estimates the self-location based on the selected self-location such that a degree of coincidence between three-dimensional point group data related to the current map and three-dimensional point group data related to the past map becomes high.

4. The self-localization device according to claim 1, wherein the self-location calculation unit is configured to determine whether there is consistency between an angle or a distance between the number of current geometric features included in the at least one set of geometric features and an angle or a distance between the number of past geometric features included in the at least one set of geometric features, and when determining that there is no consistency, the self-location calculation unit does not calculate the self-locations in the past map based on the at least one set of geometric features.

5. The self-localization device according to claim 1, wherein the self-location calculation unit is configured to select the at least one set of geometric features such that an angle formed by planes, an angle formed by straight lines, and an angle formed by a plane and a straight line in the at least one set of geometric features are equal to or larger than a predetermined angle.

6. The self-localization device according to claim 1, wherein the self-location calculation unit is configured to determine whether the current geometric feature included in the at least one set of geometric features and the past geometric feature included in the at least one set of geometric features include a ground plane as a plane corresponding to a ground, and when determining that the ground plane is included, the self-location calculation unit is configured to calculate the at least one self-location in the past map by associating the ground planes with each other in the at least one set of geometric features.

7. The self-localization device according to claim 1, wherein in a case of selecting the current geometric features of plane and sphere and the past geometric features of plane and sphere as a set of geometric features, the self-location calculation unit is configured to determine whether the current geometric features included in the at least one set of geometric features and the past geometric features included in the at least one set of geometric features include a ground plane as a plane corresponding to the ground, and when determining that the ground plane is included, the self-location calculation unit is configured to select only the sphere located at a predetermined height from the ground plane.

* * * * *